(12) United States Patent
Sharma

(10) Patent No.: US 9,891,096 B2
(45) Date of Patent: Feb. 13, 2018

(54) BODY WEIGHT SCALE WITH VISUAL NOTIFICATION SYSTEM AND METHOD

(71) Applicant: Anshuman Sharma, St. Louis Park, MN (US)

(72) Inventor: Anshuman Sharma, St. Louis Park, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 212 days.

(21) Appl. No.: 14/876,056

(22) Filed: Oct. 6, 2015

(65) Prior Publication Data

US 2016/0025550 A1 Jan. 28, 2016

Related U.S. Application Data

(63) Continuation of application No. 13/625,997, filed on Sep. 25, 2012, now Pat. No. 9,157,787.

(51) Int. Cl.
| | |
|---|---|
| *G01G 19/44* | (2006.01) |
| *G01G 19/50* | (2006.01) |
| *G01G 9/00* | (2006.01) |
| *G01G 23/36* | (2006.01) |
| *G01G 19/414* | (2006.01) |
| *G01B 21/04* | (2006.01) |

(52) U.S. Cl.
CPC .............. *G01G 19/50* (2013.01); *G01G 9/00* (2013.01); *G01G 19/414* (2013.01); *G01G 19/44* (2013.01); *G01G 23/36* (2013.01); *G01B 21/045* (2013.01); *Y10S 128/921* (2013.01)

(58) Field of Classification Search
CPC ........ G01G 19/50; G01G 9/00; G01G 19/414; G01G 19/44; G01G 23/36; G01B 21/45; Y10S 128/921
See application file for complete search history.

(56) References Cited

U.S. PATENT DOCUMENTS

| | | | |
|---|---|---|---|
| 3,655,003 A | 4/1972 | Yamajima | |
| 3,893,247 A | 7/1975 | Dana, III | |
| 4,128,861 A | 12/1978 | Pelengaris | |
| 4,130,951 A | 12/1978 | Powell | |
| 4,204,197 A | 5/1980 | Loshbough et al. | |
| 4,576,244 A * | 3/1986 | Zeigner ................. | G01G 19/44 177/245 |
| 5,307,250 A | 4/1994 | Pearson | |
| 5,608,193 A | 3/1997 | Almogaibil | |

(Continued)

FOREIGN PATENT DOCUMENTS

WO 2012037063 3/2012

*Primary Examiner* — Randy Gibson
(74) *Attorney, Agent, or Firm* — Tysver Beck Evans

(57) ABSTRACT

An interactive body weight scale is presented. The body weight scale may have computing and data communication ability to track a user's weight by connecting to a number of different electronic devices. The body weight scale is capable of recording an audio message, converting the audio message to message text, and transmitting the message to a remote social network. The scale may also receive message responses from the remote network and play the messages back based on whether a particular message is a positive message. A scale use indicator provides a reminder for a user to use the body weight scale.

10 Claims, 6 Drawing Sheets

(56) References Cited

U.S. PATENT DOCUMENTS

| | | | | |
|---|---|---|---|---|
| 5,832,417 | A * | 11/1998 | Petrucelli | G01G 23/01 177/25.13 |
| 6,038,465 | A | 3/2000 | Melton | |
| 6,336,136 | B1 | 1/2002 | Harris | |
| 6,478,736 | B1 | 11/2002 | Mault | |
| 6,538,215 | B2 * | 3/2003 | Montagnino | G01G 19/44 128/921 |
| 6,617,530 | B1 | 9/2003 | Lin | |
| 6,635,015 | B2 | 10/2003 | Sagel | |
| 6,790,178 | B1 | 9/2004 | Mault et al. | |
| 6,844,506 | B2 * | 1/2005 | Nuesch | G01G 23/01 177/25.11 |
| 6,864,436 | B1 | 3/2005 | Nobes et al. | |
| 6,974,075 | B1 | 12/2005 | Duke | |
| 7,090,047 | B1 | 8/2006 | Lee et al. | |
| 7,090,638 | B2 | 8/2006 | Vidgen | |
| 7,186,930 | B1 | 3/2007 | Wong et al. | |
| 7,274,023 | B2 | 9/2007 | Clarke et al. | |
| 7,265,301 | B2 | 12/2007 | Hunt et al. | |
| 7,304,252 | B1 | 12/2007 | Hunt et al. | |
| 7,547,851 | B1 | 6/2009 | Wong | |
| 7,596,453 | B2 | 9/2009 | Sakai | |
| 7,633,018 | B2 | 12/2009 | Leisinger et al. | |
| 7,982,140 | B2 | 7/2011 | Taylor et al. | |
| 7,994,439 | B2 | 8/2011 | Daniels et al. | |
| 8,475,367 | B1 * | 7/2013 | Yuen | G06F 19/3418 128/920 |
| 8,513,544 | B2 | 8/2013 | Eckerdt | |
| 8,704,110 | B2 * | 4/2014 | Forshaw | G01G 19/44 177/238 |
| 2001/0039493 | A1 | 11/2001 | Pustejovsky et al. | |
| 2002/0124017 | A1 | 9/2002 | Mault | |
| 2002/0134589 | A1 | 9/2002 | Montagnino et al. | |
| 2003/0065257 | A1 * | 4/2003 | Mault | A61B 5/02055 600/407 |
| 2004/0225533 | A1 | 11/2004 | Cosentino et al. | |
| 2005/0184148 | A1 | 8/2005 | Perlman | |
| 2007/0050058 | A1 | 3/2007 | Zuziak et al. | |
| 2008/0272198 | A1 | 11/2008 | Fenn | |
| 2010/0023163 | A1 | 1/2010 | Kidd | |
| 2010/0283601 | A1 | 11/2010 | Tai et al. | |
| 2010/0300768 | A1 * | 12/2010 | Reiter | G01G 19/58 177/45 |
| 2012/0314354 | A1 | 12/2012 | Rayner | |
| 2014/0063180 | A1 | 3/2014 | Sharma | |
| 2014/0095208 | A1 | 4/2014 | Goldberg | |
| 2014/0326517 | A1 | 11/2014 | Gomez | |
| 2014/0340229 | A1 | 11/2014 | Wu et al. | |
| 2015/0018991 | A1 | 1/2015 | Arnold et al. | |

* cited by examiner

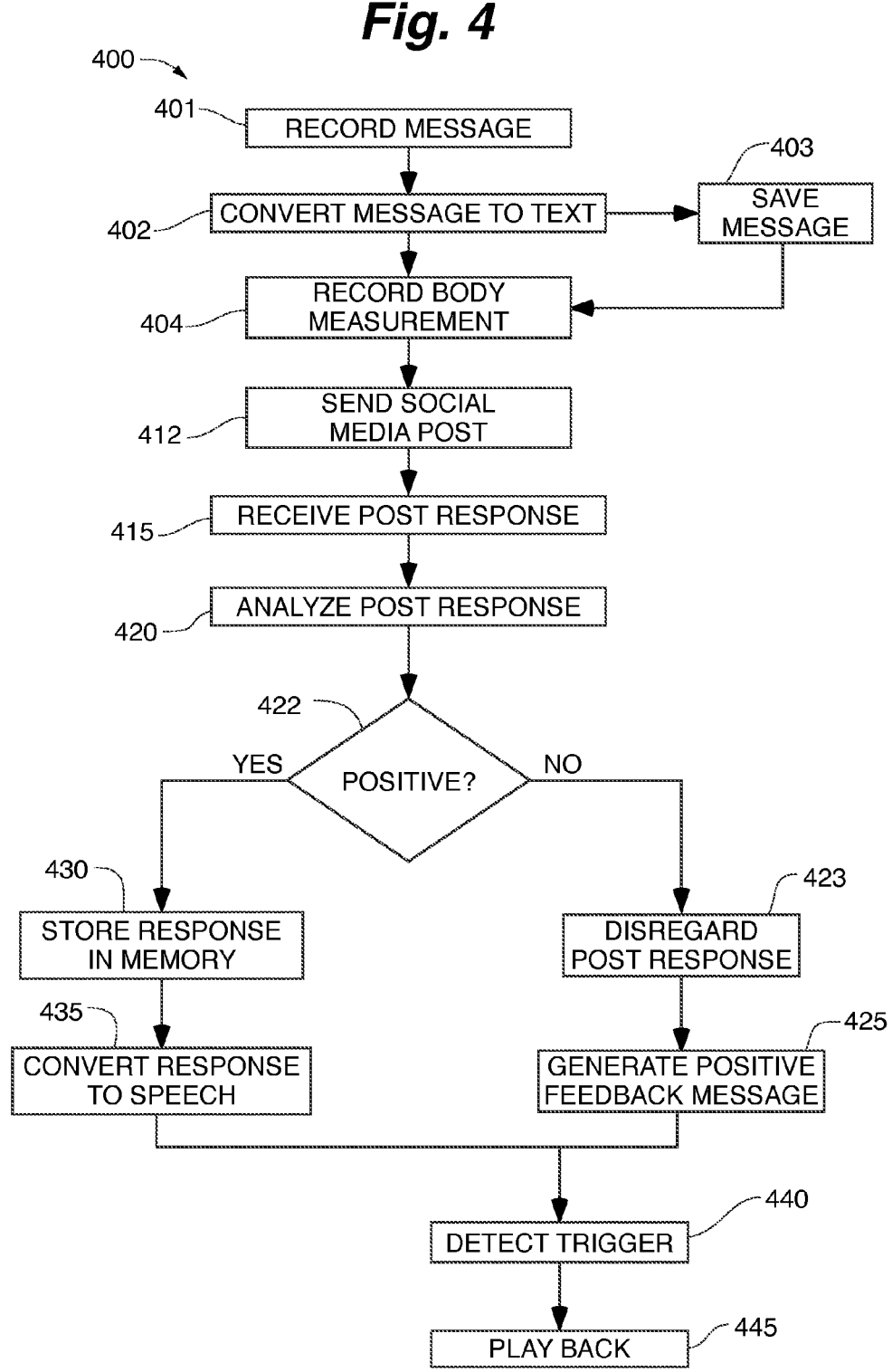

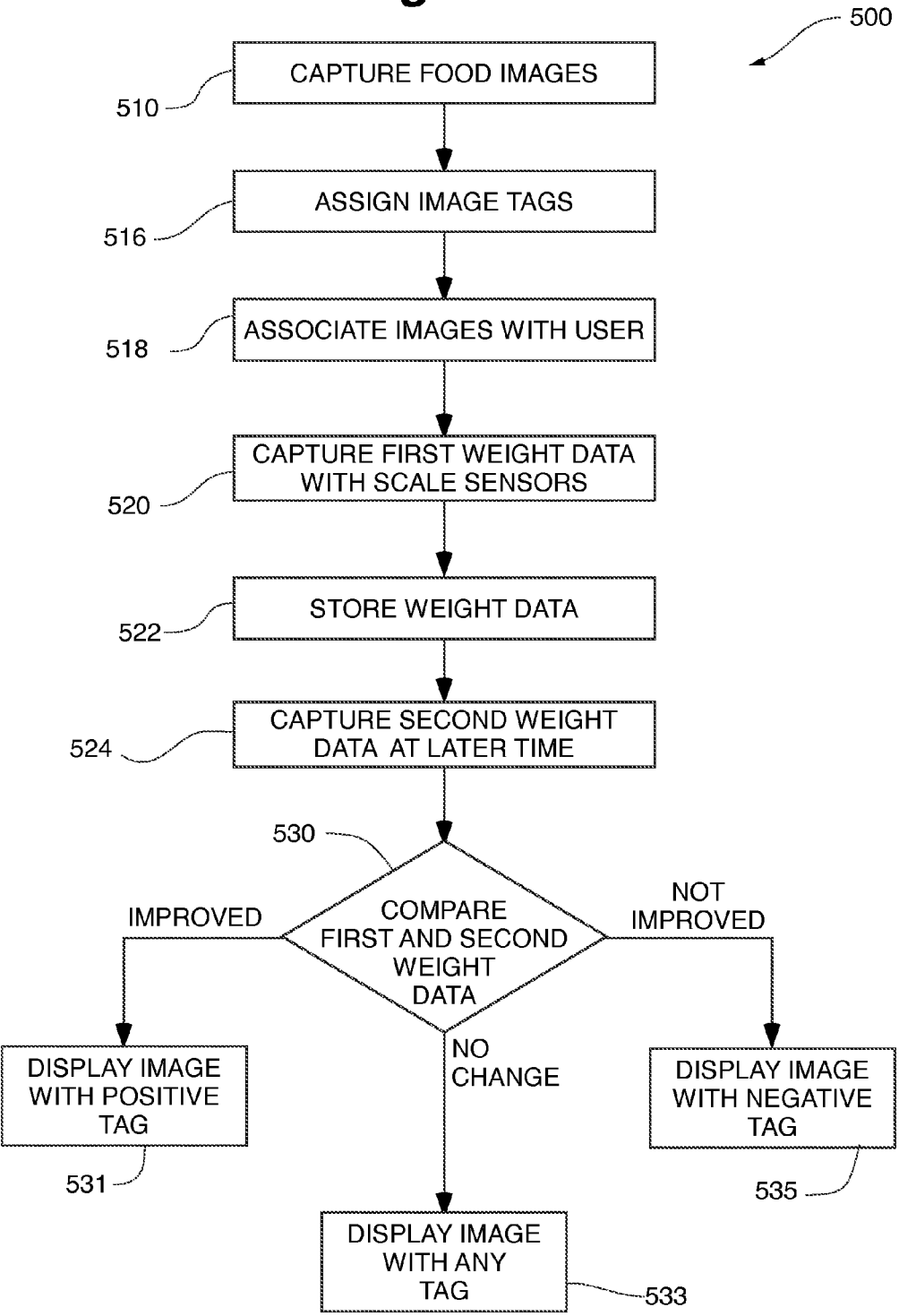

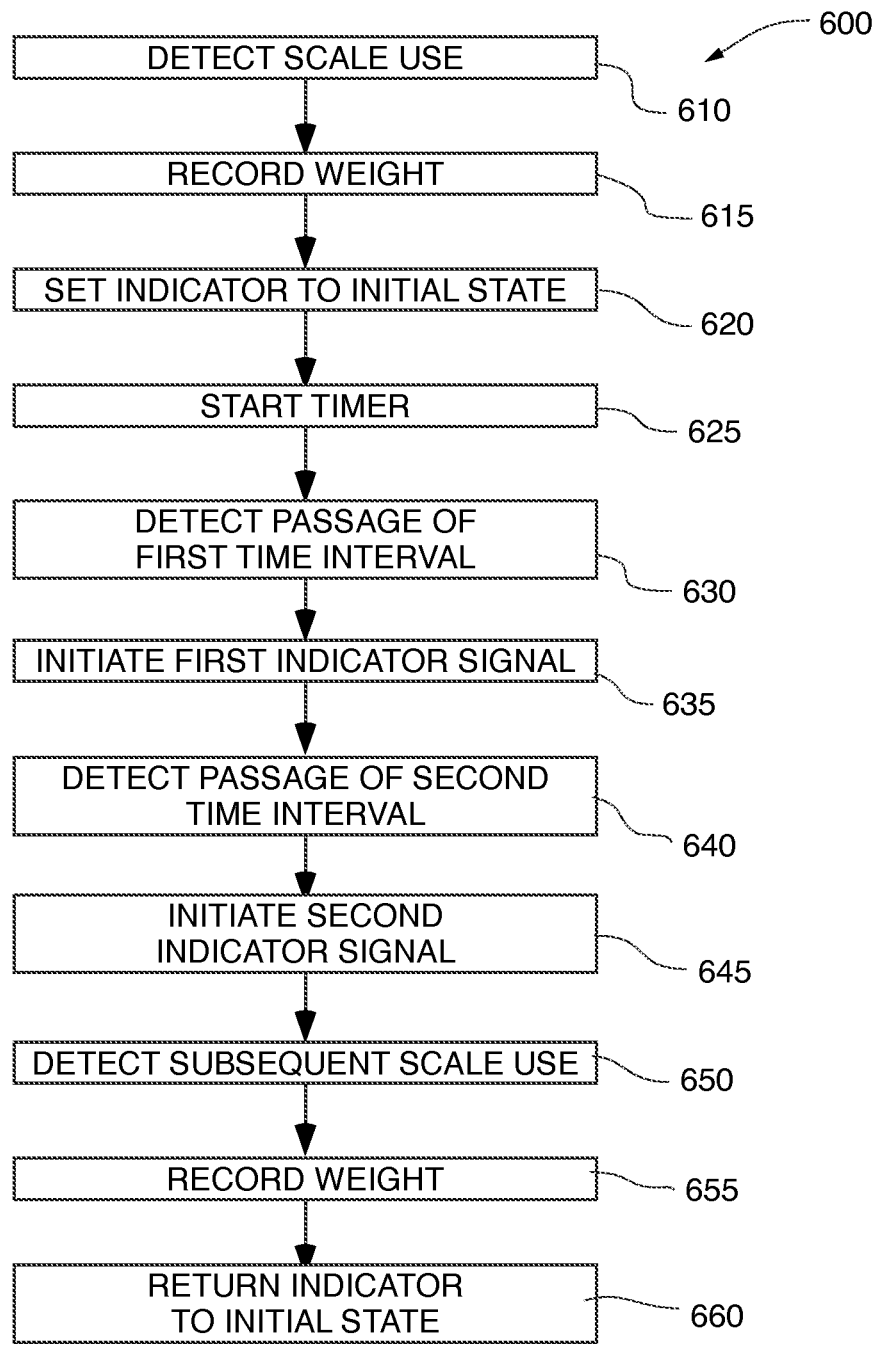

BODY WEIGHT SCALE WITH VISUAL NOTIFICATION SYSTEM AND METHOD

FIELD OF THE INVENTION

The present application relates to the field of body weight scales. More particularly, the described embodiments relate to a system and method for an interactive body weight scale.

SUMMARY

One embodiment of the present invention provides a digital body weight scale having the ability to record and transmit weight information for an individual scale user. The digital weight scale may have a load sensing surface, a display, a data input interface, a wireless communication interface, and a memory containing one or more weight logs for one or more individual scale users. The electronic scale may track health information including but not limited to weight, body fat percent, water weight, body mass index, and other health metrics. The system may comprise the body weight scale, a digital food scale, a mobile electronic device such as a smartphone, and a remote social media accessible via the Internet. The system may allow a body weight scale user to record an audio message at the scale, publish the message to a social media as a social media post, receive post responses, and read or listen to the post responses at the digital body weight scale. The system may analyze post responses to determine whether a particular post response is a positive response. If the post response is not a positive response, the post will not be displayed or played back by the scale. The scale may also play back messages pertaining to use of the digital food scale and mobile device.

In another aspect, a scale use indicator on the digital body weight scale encourages scale use by visually signaling a scale user to weigh-in on the scale. The scale use indicator may provide progressive signals depending upon the length of time since the user's most recent scale use.

BRIEF DESCRIPTION OF THE DRAWINGS

FIG. 4 is a flow chart showing a method for using an interactive body weight scale.

FIG. 5 is a flow chart showing a method for displaying images in a body weight scale.

FIG. 6 is a flow chart showing a method for a scale-use indicator.

DETAILED DESCRIPTION

Figure 1:
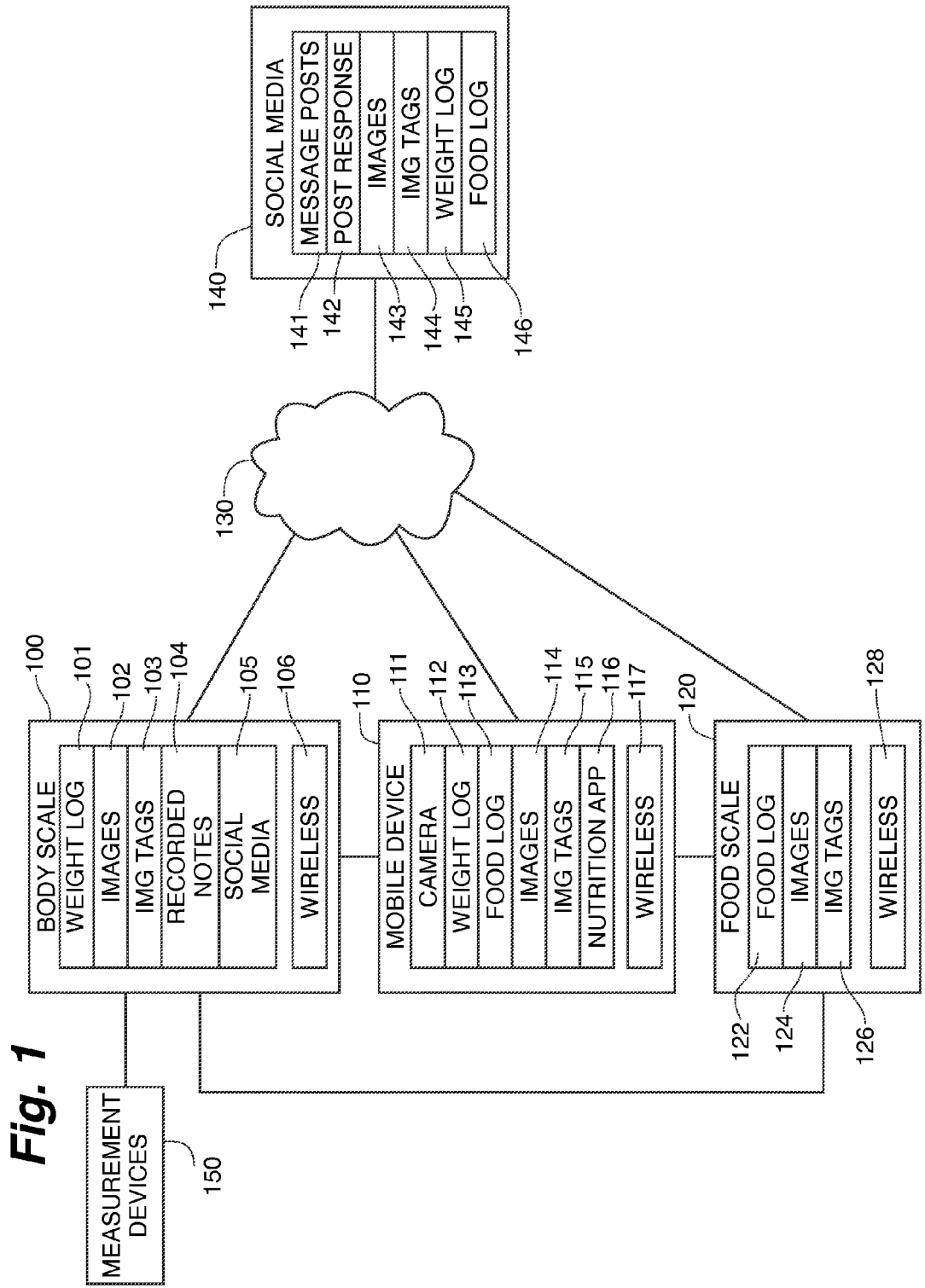
FIG. 1 is a schematic diagram of a body weight scale in data communication with external sources.

FIG. 1 shows a system utilizing a body weight scale in a data communication network. The system includes the body weight scale 100, a mobile electronic device 110, and a food scale 120, each capable of communicating with a social media 140 over a remote network 130. Social media 140 may be implemented as a website, a mobile application or computer program accessible by scale users, and may include a data store accessible via an application programming interface (API). Although the embodiment described in FIG. 1 shows only three connected devices, the system could include a number of additional connected devices 150 providing data input to scale 100, such as blood pressure cuffs, ECG monitors, heart rate monitors, activity monitors, pedometers, and other such devices 150 providing data about a user's physical state. These additional devices may also be connected to mobile electronic device 110, food scale 120, and social media 140. Devices 150 may be part of a larger system of health tracking, either for general wellness or in relation to a chronic condition such as asthma, hypertension, diabetes, obesity, and other conditions.

Body scale 100, mobile device 110, and food scale 120 each have wired or wireless data communication capability. Wireless interfaces 106, 117, and 128 of scale 100, device 110, and food scale 120 respectively, may include one or more of Wi-Fi connections, Bluetooth connections, GSM or CDMA cellular communications, or other wireless protocols. Body scale 100, device 110, and food scale 120 may each be capable of more than one type of wireless communication. The system shown in FIG. 1 provides a comprehensive way for an individual to track the individual's weight and nutrition over time. The system also comprises a data network 130 such as the Internet, which allows body scale 100 to send and receive social media messages, as well as to store weight and nutrition information remotely. In one embodiment, the integrated system may allow a user to store and access synchronized weight logs 112 and nutrition logs 113 using multiple devices 110 for multiple scale users. Other device 150 data streams may also be stored and synchronized.

Body scale 100 comprises a weight log 101, which includes weight information over a period of time for an individual. In a preferred embodiment, body scale 100 includes multiple weight logs 101 for multiple scale users. The body scale 100 preferably identifies and distinguishes between different scale users so that each user can track their weight information over a period of time. In one embodiment, the body scale 100 may recognize unique users based on recognizing the weight of an individual on the scale and predicting the correct user based on the weight. In another embodiment, the mobile device 110 may send a signal to the body scale 100 when the mobile device 110 is in proximity to the body scale 100. In this embodiment, the body scale 100 would receive the signal from mobile device 110 and select weight log 101 corresponding to the owner of the mobile device 110. Alternately, a simple device such as a key fob or watch could contain wireless signal capabilities to send a signal to the body scale 100 to select a particular weight log 101. Such a key fob or watch could also be used to signal to the body scale 100 that the user is in close proximity, which could signal the scale to perform specific tasks unique to that scale user, such as causing a light to strobe. The weight log 101 may be updated with a new log entry every time a particular individual uses the weight scale 100, for example daily or weekly. Weight log 101 may include information such as the user's weight, age, height, body fat, body mass index (BMI), weigh-in date and time, and other physical health-related data. The health-related data is preferably measured and stored in weight log 101 at regular intervals, such as every time a user weighs-in on the scale. In a preferred embodiment, body scale 100 contains recorded notes 104. The notes may be audio messages recorded at the scale using an internal scale microphone. The notes 104 are preferably stored in a physical, non-transitory scale memory. Alternately or in addition, voice-recognition software may convert the audio message into message text, after which the text note 104 could be stored on the memory. The notes may also be text notes entered using a text input such as a keyboard. Notes 104 may serve a number of purposes. The user may record messages detailing health goals, comments related to daily or weekly progress, posts to send to one or more social media services, responses to social media posts, reminder messages, etc. One or more notes 104 may be transmitted to social media 140 over network 130. If notes 104 are transmitted and posted to a social media 140, the post may receive responses from other members of the social media 140. These responses may be received via the data network and stored as social media responses 105, which may be in audio response format or text response format. Alternately, responses 105 may not be stored in memory, but instead played back as an audio or text data stream over the remote network.

The body weight scale 100 may communicate directly or indirectly with mobile device 110 and food scale 120. Devices 110, 120 may be devices as described in U.S. patent application Ser. No. 13/605,517 filed Sep. 6, 2012, and entitled "Connected Food Scale System and Method," the contents of which are hereby incorporated by reference. Mobile device 110 has a nutrition software application program ("app") 116 stored on a physical device memory. Food information tracked by the app 116 is stored in food log 113. App 116 may also receive weight data from body scale 100 and store the weight data in weight log 112. App 116 may not be limited to tracking only food and weight data. App 116 may also include activity tracking, insurance sponsored programs, medical-device and medical therapy apps, or chronic disease management apps.

Mobile device 110 preferably has an internal digital camera 111 that allows food images 114 to be captured and stored in mobile device 110. In the preferred embodiment, images 114 correspond to foods that the user has eaten, and each image 114 is associated in food log 113 with one or more food log entries for a specific date and time. A user may be able to "tag" images 114 with image tags 115. Each image 114 may have one or more tags associated with the image. Tags may categorize each image as being related to one or more other types of images having the same tag or tags. The tags may be text strings representing various attributes of foods in the images 114, such as "breakfast," "fruits," "healthy," "unhealthy," "good for me," "restaurant meal," or other food categories or attributes.

Food scale 120 is preferably able to communicate with one or both of the mobile device 110 and body scale 100. Food scale 120 may have a food log 122 that is synchronized with the food log 113 of mobile device 110. Images 124 and image tags 126 of food scale 120 may also synchronize with images 114 and image tags 115 of mobile device 110. Body scale 100 may receive images 114, 124 from one or both of mobile device 110 and food scale 120, and store the images 114, 124 as images 102 in connection with the weight log 101 of body scale 100. The images may later be displayed to the scale user.

Social media 140 may synchronize with body scale 100, mobile device 110 and food scale 120. Social media 140 could also synchronize directly or indirectly with a number of third party applications or devices. Images 143, images tags 144, weight log 145, and food log 146 may be uploaded to the social media 140 to be stored. Social media 140 may also store message posts 141, which may be recorded notes 104, and post responses 142 which may be transmitted to body scale 100 as social media responses 105.

Figure 2:
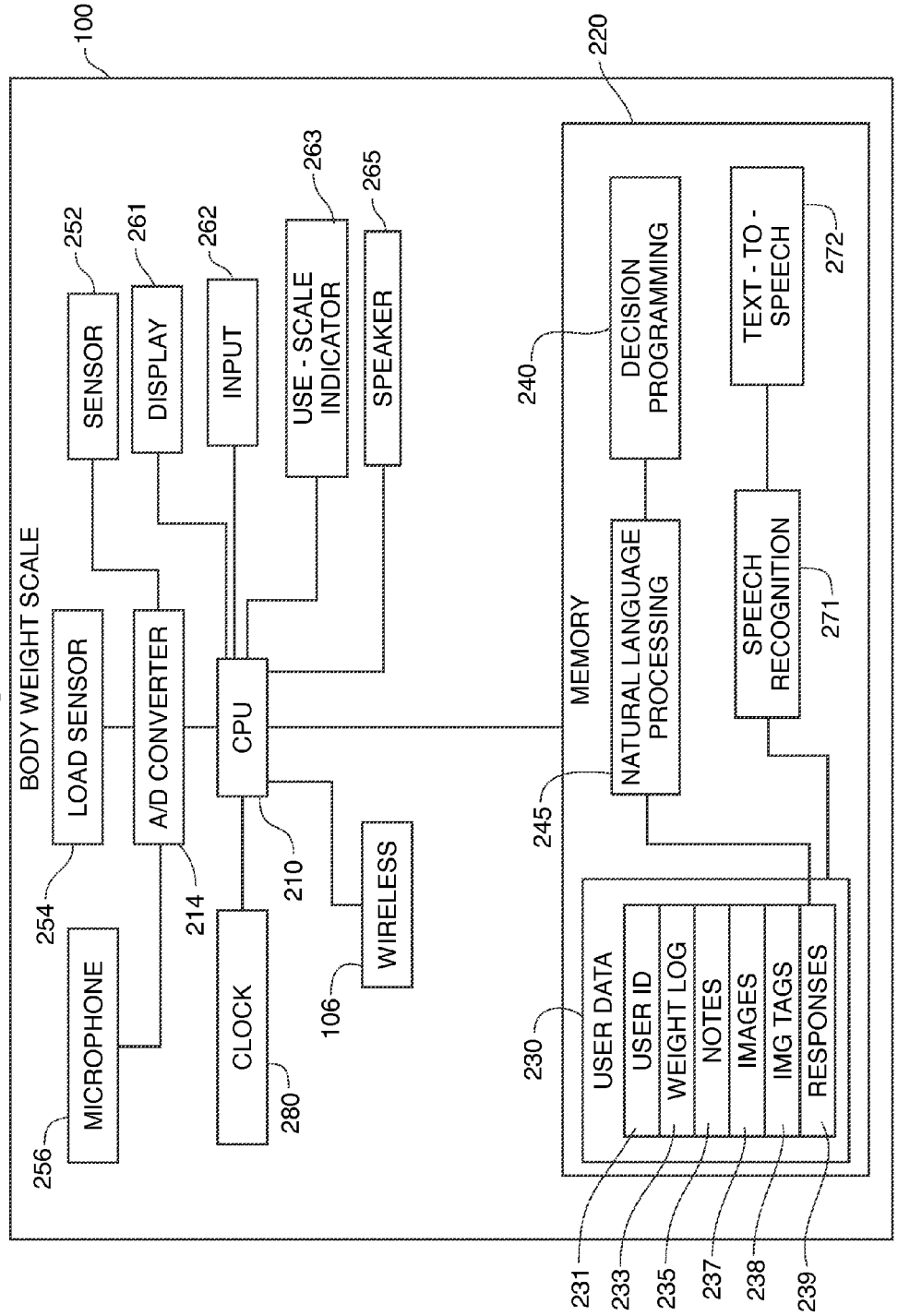
FIG. 2 is a schematic diagram of internal elements of the body weight scale.

Turning to FIG. 2, body weight scale 100 contains internal components for functioning within the system of FIG. 1. Body scale 100 includes a central computer processor (CPU) 210 connected to a physical, non-transitory memory 220. A wireless communication interface 106 provides data communication connectivity to a remote network 130. Memory 220 stores user data 230 including a user identifier 231 to uniquely identify a scale user, a weight log 233 uniquely belonging to the user identified by user ID 231, one or more notes 235, images 237 of foods eaten by the user 231, image tags 238 belonging to images 237, and responses 239 received from a social media 140. Images 237 may be received, via a data connection, from one or more of food scale 120, mobile device 110, and social media 140. Although not specifically listed in FIG. 2, other types of related data may be stored, such as water weight, lean weight, body fat percent, body mass index, etc. The elements stored in memory 220 may be also synchronized and stored remotely in a cloud-based storage.

Body weight scale 100 may have various sensors and input devices. A load sensor 254 captures body weight, which is converted to a digital weight signal by an analog-to-digital converter 214. A microphone 256 allows a scale user to record audio notes 235, and one or more body measurement sensors 252 may record other body measurements. Sensors 252 may include body fat sensors, blood pressure cuffs, ECG monitors, heart rate monitors, and other such sensors for detecting physical measurements for a scale user. A speaker 265 and visual display 261 provide output to the user. A data input device 262 may include a keyboard, mouse, touch screen, or other controller to allow a user to input information into the body scale 100. Additionally, scale 100 has a clock 280 to determine weigh-in date and time for a particular scale use.

The body scale 100 of FIGS. 1-2 may have communication capabilities for interacting with social media 140. A user may record a message using microphone 256. The recorded audio message may be processed by speech recognition software 271 and sent via the wireless interface 106 to social media 140 as a social media post. The body scale 100 may also receive post responses 239 from social media 140. A text-to-speech program 272 may convert a message response text 239 to an audio message that can be played back on speaker 265. Alternatively, the messages received from the social media 140 could be audio messages that can be played over speaker 265 without the need for text-to-speech conversion. In one embodiment, social media responses 239 are analyzed using natural language processing programming 245 and decision programming 240 to determine whether a response 239 should be played back on speaker 265. For example, a user may wish to only hear social media responses 239 that are positive responses. This allows a user to ignore unconstructive and detrimental comments while attempting to achieve a goal.

FIGS. 3A-3D represent examples of an interactive display 300 for a body weight scale 100. The display screens 300 depicted in FIG. 3A-3D represent one possible implementation of display 300. It is possible that display 300 could have more or fewer viewing features. In one embodiment, display 300 could show only the body weight of the scale user when the user is being weighed on the scale 100. Display 300 could be implemented as a touch-enabled video screen at a scale user's waist or eye level. Display 300 could also be implemented as an app 116 on mobile device 110. In this embodiment, mobile device 110 would act as both input device 262 and display 261 for body scale 100. Body scale 100 could then simply display the weight of the scale user on a display of the weighing surface. Audio recognition could also be used to pan through the different screens in FIG. 3A-3D.

Figure 3A:
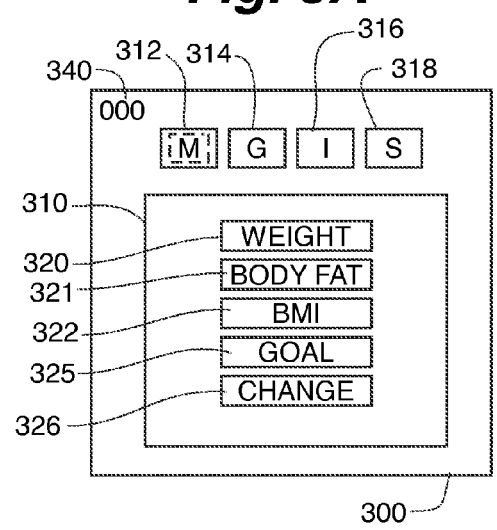
FIGS. 3A-3D show exemplary visual displays for the body weight scale.
Figure 3B:
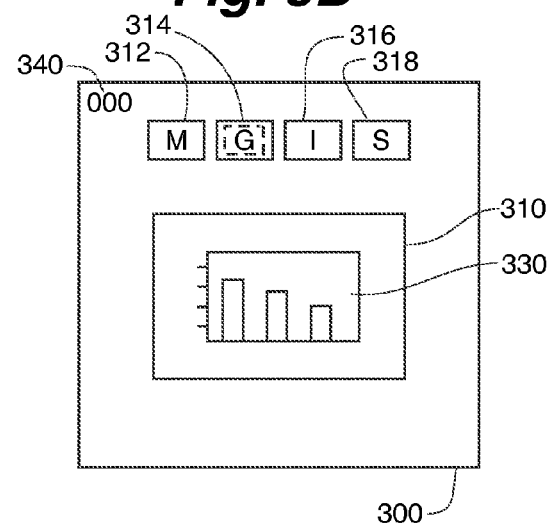
Figure 3C:
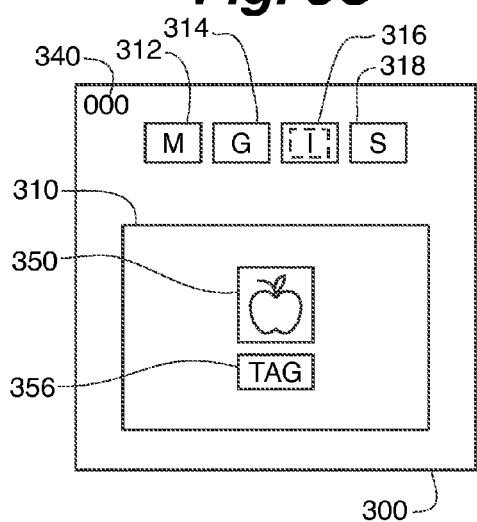
Figure 3D:
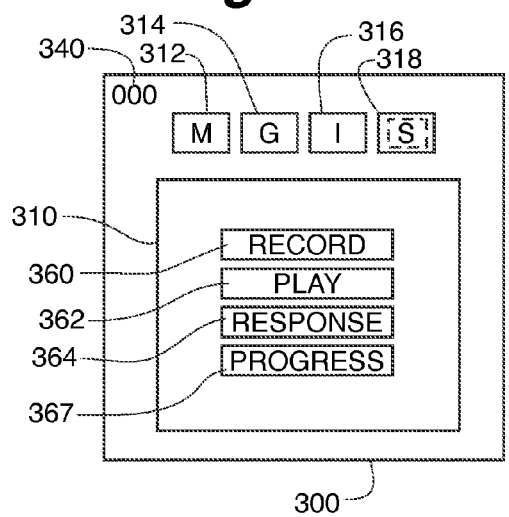

The display 300 may allow a user to view data in many different ways. In one embodiment, display 300 has a screen 310 that changes based on a selection of buttons 312, 314, 316, 318. These buttons may be small buttons designed to be utilized by pressing the buttons with a finger. Alternatively, in an embodiment in which display 300 is provided on a weighing surface of scale 100, the buttons could be larger to allow user interaction by pressing the buttons with a user's foot. As shown in FIG. 3A, the Main button 312 displays a current weight 320 for a scale user, a current body fat percentage 321, a current body mass index 322, a goal 325, and a change in weight 326 since the most recent user weigh-in. Other raw scale data could also be displayed. In FIG. 3B, The Graph button 314 allows a user to view a graph 330 of previous weight data. Graph 330 may show the user's change in weight over a period of time. In FIG. 3C, Images button 316 allows a user to view images 350 of foods eaten by the individual. In one embodiment, the images 350 are images of foods that the user has eaten within a specific time period. For example, images 350 could be images received from mobile device 110 for foods eaten within the past 7 days, or past 24 hours, or other specific time period. The images 350 may also be chosen from among all images 102 in the body scale 100. The images 350 may have associated tags 356 that represent categories or attributes of the corresponding images. In FIG. 3D, the Social button 318 allows a user to view a screen to send and receive social messages. The Social 318 display may have a "record" button 360 to record an audio note 104, a "play back" button 362 to play back notes 104, and a "play responses" button 364 to play back selected social media responses 105. The Social display 318 could alternately display social media responses as text. A "progress" button 367 may cause the scale to present encouraging messages for the scale user in response to a specific achievement or overall goal.

Display 300 may also have one or more indicators 340 to remind an individual to weigh-in on the scale. The indicator 340 provides a means for driving adherence of scale use. Indicator 340 could for example be LED lights of various colors, or could be part of the scale display 310. The indicator 340 may be used in a number of ways. The indicator 340 may flash or strobe, may change color, may vary in strobe duty cycle, etc. For example, a user may be assigned an indicator 340 of a first color. If the user does not use the scale for more than, for example, three days, the indicator 340 would begin to flash at a low duty-cycle. The duty-cycle may increase successively as more time elapses between consecutive weigh-ins by the scale user. In an alternate configuration, an indicator for an individual may be a first color when the individual is weighed on the scale. After a predetermined amount of time, if the user has not used the scale, the indicator would change to a second color. Later, if the user has not used the scale after a second predetermined time, the indicator would change to a third color. The display 300 may be capable of notifying more than one user, either by assigning a single light to a single user, or by assigning a single light color to an individual scale user. Each user's scale activity is tracked independently. In an alternate embodiment, the indicator 340 could also include audio indicators such as a tone, beep, alarm, or other audible indicator. In one embodiment, a mobile device 110 or other wireless device may send a user-identifying signal to body scale 100 when the mobile device 110 is in proximity to body scale 100. In this embodiment the indicator 340 could function to only illuminate or sound when mobile device 110 is in proximity to body scale 100. Indicator 340 would then only display a reminder when the user is near body scale 100.

While the indicators 340 are shown in FIG. 3A-D as being on the same surface as the display 300, one of the preferred embodiments utilizes the indicators on a different surface. For instance, the indicators 340 could face the ground when the scale is in use. When lit, the indicators 340 would create an "aura" of light around the bottom of the scale that could be noticed from across the room, yet still remain unobtrusive. In other embodiments, the indicators 340 could consist of a plurality of LED lights located around the periphery of the body scale 100. Lighting patterns of the indicators 340 would again be noticed from across the room. In this example, if the periphery of the scale 100 were glowing green, the user associated with the green color would know that it is time to use the scale. If more time passes, the color could pulse to indicate that it has been longer since the user has taken a measurement. The pulse could then turn into an on-off flashing after an even longer period. In an embodiment utilizing a key fob or watch to communicate to the scale that a user is present, the indicator 340 could increase light intensity for the user identified by the key fob or watch.

In FIG. 4, a method 400 for using an interactive body scale is presented. Although the method 400 is presented in FIG. 4 as a series of sequential steps, the steps may be performed in any order, and in any combination; it would be possible to implement variations that exclude steps or that include additional steps. With reference to FIGS. 1-2, in step 401, a message is recorded at the scale, using a microphone 256. The message may be an audio message, and may be converted in step 402 from an audio message to message text via speech recognition programming 271. Alternately, the message may be received as text input via an input device 262. In step 403, the message may be stored as audio or text in a memory 220 of scale 100. In step 404, the scale records a current user body measurement. In one embodiment the body measurement is a user weight detected using weight sensor 254. The body measurement could also include BMI, body fat percent, heart rate, or other such body measurements detected by sensor 252. In an alternate embodiment, the recorded body measurement is not a number, but a calculated value based on current and previous measurement data, such as a percent change in weight (e.g., 1% of body weight lost). In step 412, a social media post related to the body measurement recorded in step 404 is sent. The social media post may be a message that reflects the individual's mood at the time of weighing, or may be a reaction by the user of the user's current state in relation to a goal. Step 412 may be performed automatically in response to recording the message in step 401, or in response to recording the body measurement in step 404. In another embodiment, the scale user must actively choose to initiate sending the social media post, for example through user interface 300, or through a command on mobile device 110. The body measurement may also be sent along with the social media post.

In step 415, a textual or audio response to the social media post is received at the scale 100 from the social media 140. In most cases, this response will be related to a message posted earlier by the user of the scale 100. The post response may be positive, (e.g., "Keep up the good work!"), or not positive (e.g., "You haven't made any progress yet."). In step 420, the post response is analyzed using natural language processing programming 245 and decision programming 240 to determine whether the post response is a positive response. At step 422, if the post response is positive, the method proceeds to step 430, in which the post response is stored in the memory 220 of scale 100. In an alternate embodiment in which post responses are streamed directly from a remote data connection, the post response would not be stored, but would be received and analyzed on-demand. In step 435, if the positive post response is a text response, the text is converted to audio via text-to-speech programming 272. The method 400 then proceeds to step 440, in which the post response is played back at the scale as audio through speaker 265.

If the post response is analyzed and found to be not positive in step 422, the post response is disregarded in step 423, and not played back at scale 100. Instead, in step 425, the scale 100 generates a positive feedback message for the user. The message may be a pre-recorded message, or could also be a post response received in the past. The chosen feedback message could also be the message recorded in step 401, to remind the user of their goal. In step 440, the message is played back as audio on the scale speaker 265.

In step 440, the message may be played back in response to a trigger, such as a load being sensed on the weight load sensor, or a request from a user received via the scale user interface. A push notification from the social media may also trigger the message to be played back in step 440. The message may be played back sequentially along with the post response, allowing the scale user to hear both the originally posted message and the post response together. In an alternate embodiment, the text could be simply displayed on the scale display 261, and not played back as audio. In some circumstances, the played message could be selectively played based upon how well the user of the scale 100 is meeting a certain weight loss goal. For instance, if a user has not progressed toward their goal in the last few weighing sessions, the scale 100 could respond with a positive message recorded by a friend to the social media 140 supporting the user as they try to reach their goal. If no responses are received in step 415, then the body weight scale may provide a message to play back in step 430. This message may be based on perceived progress made by the scale user. This ensures that the user is always able to receive positive feedback at the scale.

The method of FIG. 4 could be repeated for the scale user at a later time. In these subsequent repetitions, steps 401 and 410 could be skipped, and the message saved in step 410 could be associated with a subsequent body measurement in step 403 and then sent as a social media post in step 412. The method 400 would then continue as indicated.

FIG. 5 presents a method 500 for displaying food images at a body weight scale. The method may be implemented in the system of FIG. 1. In step 510, food images are captured. The images may be food images 114 captured by an internal digital camera 111 of a mobile device 110 and transferred to the body scale 100 to be stored as food images 102 in the scale memory. The images may alternately be crowd-sourced or stock images stored remotely as images 143 of social media 140. In step 516, image tags 103 are assigned to one or more food images 102. The images and image tags could also be generated at food scale 120, or via social media 140. In step 518, the tagged images 102 are associated with a particular user. In this step, the images may also be associated with a particular time or date, specifying when the user ate the food. In step 520, the scale captures first weight data for the user. The weight data is stored in step 522. The data may be stored in weight log 101 residing on memory 220, and may also be stored in a memory of a mobile device. The weight data in step 522 may also be stored by social media 140. In step 524, second weight data is captured for the user at a later time. For example, the user might be weighed the next day or the next week. Once the second weight data has been collected at the scale, in step 530 the first and second weight data are compared. In general, the first weight data with be either greater than, less than, or the same as the second weight data. Depending on the user's goals (e.g., gaining or losing weight), the scale 100 determines whether the individual is nearing a predetermined goal. If the second weight is improved, that is, closer toward the goal than the first weight, a first image 102 having a positive-association tag 103 is displayed at step 531. For example, if the user's goal is to lose weight and the second weight data is lower than the first weight data, an image with a "good for me" tag 103 will be displayed. This positively reinforces the user to continue to eat healthy foods. If there is no change between the first and second weight data, or if the difference between the first and second data is small (for example, less than 1 lb.), in step 533 food images 102 may be shown at random, or images may be shown as a slide show, comparing "good" foods and "bad" foods tagged by the user for a particular past time period. This allows the user to think about food choices, and helps to reinforce the user to make healthy choices. If the second weight data is not improved or has worsened in comparison to the first weight data, in step 535 and image with a negative tag 103 is displayed to the user. For example, an image with an "unhealthy" tag 103 could be shown, to indicate to the scale user the type of food choice that may be detrimental to the user's weight goals.

The tags associated with the images may be tags created by the user when the food images were captured. Alternatively, the foods images could be associated with food data, such as calorie or fat content. In the incorporated patent application Ser. No. 13/605,517, images are created by a mobile device such as device 110 and associated with food data at a central computer. The device 110 could analyze the food data associated with the image to determine whether the food should be tagged as supporting the user's goal (low calorie or low fat food for a weight-loss goal) or tagged as being adverse to the goal (e.g., high calorie, high fat, or high sugar content food for a weight-loss goal). These automatically generated tags could then be used in association with the images by the scale 100 to control when the images are displayed after a weighing session.

FIG. 6 shows a method 600 for reminding and encouraging use of a body weight scale 100. The method 600 utilizes an indicator 340 to signal an individual to weigh-in on the scale 100. The indicator 340 could, for example, be an LED or series of multiple LEDs, an assigned area on display 310, or an aura of light around the scale surface or floor. Other implementations are possible, and will be evident. Although the method 600 is presented in FIG. 6 as a series of sequential steps, the steps may be performed in any order, and in any combination; it would be possible to implement variations that exclude steps or that include additional steps. Specifically, the indicator 340 may return to its initial state if the individual weighs-in at the scale 100 at any point during the method. In step 610, a scale use is detected. The detection may be performed by CPU 210 in response to a signal from load sensor 254 of FIG. 2. In one embodiment, the scale use detection may include recognizing an individual user, by such means as receiving a user identifier, receiving a user-identifying signal from mobile device 110, or predicting an individual user based on weight or other body measurement measured by the scale when the user steps on the weighing surface. An auditory or visual confirmation of the user's identify may be made during this step. In step 615, a weight is recorded at the scale, and stored in memory 220. In one embodiment, the weight may be stored in a user weight log 233. In step 620, and indicator 340 is set to an initial state, which depends on the specific implementation of the indicator 340. The initial state may be an OFF state in which the indicator is not illuminated, or could conversely be an ON state in which the indicator illumination remains constant. The initial state could be a first color of light, a first duty cycle flash, a first illumination intensity, or a similar signal. In step 625, after the scale use is detected, clock 280 within scale 100 begins to track the amount of time since the individual's most recent weigh-in. At step 630, the passage of a first time interval is detected by clock 280. The time interval may be, for example, three days. After the first time interval is detected, in step 635 the indicator 340 initiates a first indicator signal. The first indicator signal may be an altered state of indicator 340 different from the initial state in step 620. The first indicator signal may be a color, a duty cycle flash, a light intensity, or other type of signal. In an alternate embodiment, an intermittent reminder sound or tone could also be produced along with the first indicator signal. The clock 280 continues to track the amount of time since the individual's most recent weigh-in. At step 640, if the individual has not used the scale 100, a second interval of time is detected by the clock 280. In response, at step 645, the indicator 340 discontinues the first indicator signal and begins to display a second indicator signal different from the first indicator signal. The second signal may be a different color, a different duty cycle, or an increased light intensity, etc. In an embodiment in which more than one LED is assigned to a single user, the second signal may also be provided as an increased number of illuminated LEDs. The system may continue to detect increasing time intervals, each time the indicator 340 initiating a new, more urgent indicator signal. Intermittent reminder sounds or tones may also be used. When an individual does weigh-in using the scale 100, the subsequent scale use is detected in step 650. The individual's weight is recorded, which may include storing the weight in a weight log 233. After the weight is recorded, the indicator 340 returns to the initial state in step 660.

The many features and advantages of the invention are apparent from the above description. Numerous modifications and variations will readily occur to those skilled in the art. For example, data in the system could be implemented as a "cloud-based" system in which data storage and analysis is performed remotely, and then sent to the body weight scale on-demand. In this implementation data storage capacity in the weight scale, mobile device, and food scale could be reduced, making the system more efficient. Since such modifications are possible, the invention is not to be limited to the exact construction and operation illustrated and described. Rather, the present invention should be limited only by the following claims.

What is claimed is:

1. A notification system comprising:
    a) a body weight scale having
        i) a light-emitting indicator on the scale,
        ii) a computer processor, and
        iii) a tangible, non-transitory scale memory;
    b) programming residing on the scale memory, the programming configured to
        i) record a scale use event including a weight measurement at a first time,
        ii) after a first predetermined time interval from the first time, cause the indicator to produce a visible use-scale light signal,
        iii) after a second predetermined time interval from the first time, cause the indicator to alter the use-scale light signal, and
        iv) when the scale is re-used, reset the first time to reflect the time of the scale re-use.

2. The system of claim 1, wherein the use-scale light signal is one of a light flash duty cycle, a color, and a light intensity.

3. The system of claim 1, wherein the indicator is located on the scale at one of a scale weighing surface, a scale display, a scale base, and a peripheral scale border.

4. The system of claim 1, wherein the indicator comprises a plurality of light emitting diodes, wherein the use-scale light signal is altered after the second predetermined time interval by increasing the number of light emitting diodes that are lit.

5. The system of claim 1, wherein the programming further detects a first signal indicating a presence of a first user.

6. The system of claim 5, wherein the indicator produces the visible use-scale light signal only when the programming detects the first signal indicating the presence of the first user.

7. The system of claim 6, wherein the first signal is a first user-identifying signal that identifies the first user.

8. The system of claim 7, wherein the programming further detects a second user-identifying signal that identifies a second user, further wherein the programming separately tracks scale use for the first and second users, and further wherein the programming causes the indicator to create separate use-scale light signals based on each users use of the scale.

9. The system of claim 8, wherein the user-identifying signals are received from devices in proximity to the scale, with each device being associated with a separate user.

10. A notification system comprising:
    a) a body weight scale having
        i) a light-emitting indicator on the scale,
        ii) a computer processor, and
        iii) a tangible, non-transitory scale memory;
    b) programming residing on the scale memory, the programming configured to
        i) record a scale use event including a weight measurement at a first time,
        ii) detect a user-identifying signal from a device in proximity in the scale,
        iii) only after a predetermined time interval from the first time and only when the user-identifying signal is detected, cause the light-emitting indicator to produce a visible use-scale light signal, wherein the light-emitting indicator does not produce the visible use-scale light signal before the predetermined time interval, and further wherein the light-emitting indicator does not produce the visible use-scale light signal when the user-identifying signal is not detected.

* * * * *